AUTOMATIC FREQUENCY CONTROL SYSTEM

Filed July 23, 1967

INVENTOR.
WALTER LOEWENSTERN, JR.

BY Russell A. Conaan

AGENT

AUTOMATIC FREQUENCY CONTROL SYSTEM

Filed July 23, 1967 2 Sheets-Sheet 2

INVENTOR.
WALTER LOEWENSTERN, JR.
BY Russell A. Cannon
AGENT

United States Patent Office 3,418,595

Patented Dec. 24, 1968

3,418,595

AUTOMATIC FREQUENCY CONTROL SYSTEM

Walter Loewenstern, Jr., Los Altos, Calif., assignor to Sylvania Electric Products Inc., a corporation of Delaware Filed July 28, 1967, Ser. No. 656,724
3 Claims. (Cl. 331—9)

ABSTRACT OF THE DISCLOSURE

This automatic frequency control system comprises a voltage controlled oscillator that is responsive to a bias voltage, which is proportional to the difference in the power in an input pulse having frequencies greater than and less than the oscillator frequency, for causing the oscillator frequency to be equal to the centroid frequency of the pulse. The bias voltage is produced by the input pulse and the oscillator output in an image outphasing circuit to produce first and second output signals containing the energy in the input pulse at frequencies greater than and less than the oscillator frequency, respectively. These output signals are detected, integrated, and combined in a difference amplifier to produce the bias voltage.

*Background of invention*

This invention relates to automatic frequency control and more particularly to an improved system for automatically producing a signal having a frequency equal to the centroid frequency of a pulse signal.

Pulse communication systems are capable of transmitting more information at higher power levels and in narrower frequency bands than are conventional voice modulation type continuous wave systems. Pulse systems are also finding increasing application in satellite communication systems. A pulse communication system for amplifying a small incident signal up to full transmitter power, which may exceed 100 watts, with a bandwidth wider than two megacycles requires a physically large and heavy transceiver. Although relatively light weight solid state equipment can be designed to increase the level of an incident signal 100 db to the milliwatt level, physically larger and heavier equipment is required to further increase the wideband signal level to a greater than 100 watts. As size and weight considerations are important in portable and satellite systems, it may be desirable to reconstruct the incident signal at higher power levels rather than to amplify the signal at full bandwidth.

Present day automatic frequency reproducing systems employ null seeking techniques. In a prior art radio frequency (RF) system employing null seeking techniques, and input signal is mixed with the output of a variable frequency oscillator to produce an intermediate frequency (IF) signal that is applied to a frequency discriminator. The discriminator provides an output having an amplitude that is proportional to the frequency of the input signal. The discriminator output is a prescribed reference potential for an input signal having a particular frequency, called the crossover frequency, and is greater than or less than this reference potential when the frequency of the input signal is greater than or less than the crossover frequency, respectively. The discriminator output is applied to the variable frequency oscillator to adjust its output frequency so that the intermediate frequency of the mixer output is equal to the crossover frequency. The output of a fixed frequency oscillator having a natural frequency equal to the discriminator crossover frequency is mixed with the output of the variable frequency oscillator and filtered to produce a signal having a frequency equal to the frequency of the input signal. Such a system is complex, requiring at least two oscillators to produce a signal having the correct frequency. Since mixers must operate at relatively low power levels, less than approximately one milliwatt, a large amount of RF gain is required to increase the level of the output signal above 100 watts. This necessitates more tubes in the system which substantially increases the size, weight, and cost of a system operating at microwave frequencies. Also, since the intermediate frequency must be less than one-half the system bandwidth, it is possible that the system will have a very high intermediate frequency. This further increases the system costs and imposes severe requirements of crystal stabilization on the discriminator and the fixed frequency oscillator in order to obtain reasonable frequency accuracy. This invention is directed to the provision of a system which overcomes these disadvantages.

An object of this invention is the provision of an improved system for producing a signal having a frequency equal to the frequency of an incident signal.

Another object is the provision of a system for producing a signal having a frequency equal to the centroid frequency of an incident pulse signal.

Another object is the provision of a simplified automatic frequency reproducing system in which the local oscillator can operate at high power levels.

*Summary of invention*

Briefly, a voltage controlled oscillator responds to the difference in total energy in the different signal components comprising a received pulse, which components have frequencies greater than and less than the oscillator frequency, and causes the oscillator frequency to be equal to or to track the pulse centroid frequency. This is accomplished in acordance with this invention by combining the input pulse with the output of the oscillator in an image outphasing circuit having a pair of outputs. One output is proportional to the energy in the pulse having a frequency less than the oscillator frequency. The other output is proportional to the energy in the pulse having a frequency greater than the oscillator frequency. The total energies in these outputs are compared in a difference circuit to produce a voltage that biases the oscillator to cause its operating frequency to track the centroid frequency of the pulse.

*Description of drawings*

This invention will be more fully understood from the following detailed description of preferred embodiments thereof, together with the accompanying drawings in which.

*Description of preferred embodiments*

Figure 1:
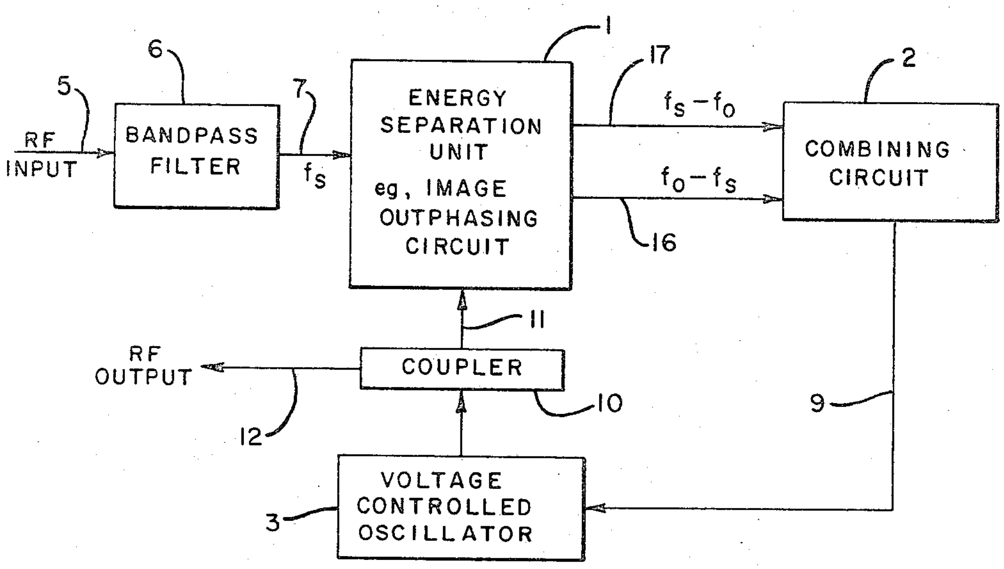
FIGURE 1 is a block diagram of a system embodying this invention.
Figure 3:
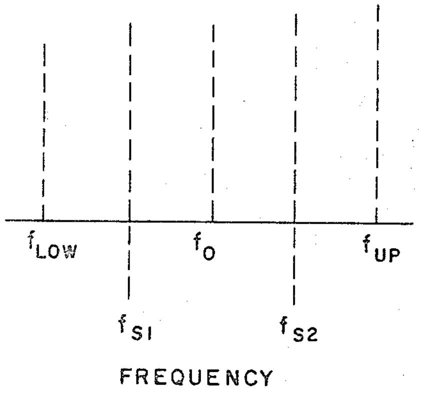
FIGURE 3 is a graphic representation of frequencies associated with a system embodying this invention.

Referring now to FIGURE 1, a system embodying this invention comprises energy separation circuit 1, signal energy combining circuit 2, and voltage controlled oscillator (VCO) 3. An RF input signal on line 5 is coupled through filter 6 and is applied on line 7 to the first input to separation circuit 1. Filter 6 is a bandpass filter having upper and lower frequency limits $f_{UP}$ and $f_{LOW}$, respectively (see FIGURE 3), which determine the frequency band over which the system operates.

Oscillator 3 is electronically tuned and may, by way of example, be a high power voltage tuned magnetron oscillator. The operating frequency of the oscillator is controlled by a bias voltage on line 9. During quiescent conditions when an input signal is not present on line 5, the VCO is biased to have an operating frequency equal to the center frequency $f_0$ of filter 6. The output of the VCO is applied to a coupler 10 which may be a 30-db directional coupler. The coupled port of coupler 10 is connected on line 11 to the second input to separation circuit 1. The output of the system on line 12 is coupled from the direct port of the directional coupler.

Separation circuit 1 is a 4-port network having a pair of input ports connected to lines 7 and 11 and a pair of output ports connected to lines 16 and 17. Separation circuit 1 combines the oscillator and received signals such that all signal energy having a frequency $f_s$ less than the oscillator frequency $f_0$ is coupled to line 16 and all signal energy having a frequency $f_s$ greater than the oscillator frequency is coupled to line 17. The energy separation circuit may, by way of example, be an image out-phasing circuit such as is described in the article, "Phasing Unwanted Images Out of Microwave Receivers," by Murray Loss, Electronics, July 12, 1965, pages 89–94. Briefly considering the operation of a superheterodyne receiver, the mixer produces an intermediate frequency signal when the frequency of a received signal is both greater than and less than the local oscillator frequency by an amount equal to the intermediate frequency. Only one of the received signals, e.g.. the received signal having a frequency less than the local oscillator frequency, however, is the signal to which the receiver is tuned. The other signal, having the frequency greater than the local oscillator frequency, is called the image signal. Through selective combination and shifting of the phase of the received and local oscillator signals in an image outphasing circuit the signals produced by the desired intermediate frequency and image signals may be separated and connected to different lines such as the lines 16 and 17. Combining circuit 2 is responsive to the output signals from the separation circuit for producing an error voltage proportional to the difference in the energy on lines 16 and 17.

Figure 2:
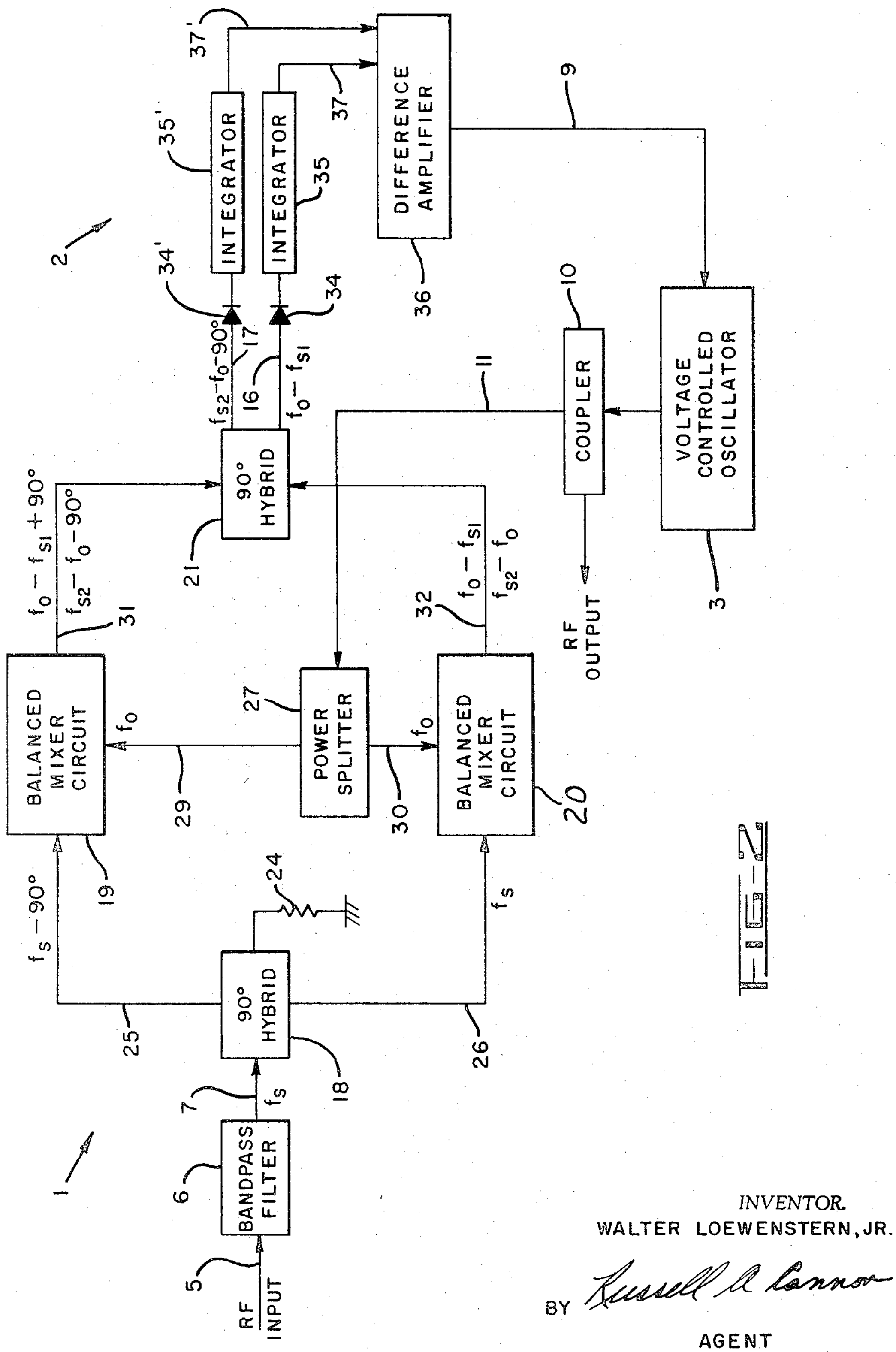
FIGURE 2 is a detailed block diagram of the system of FIGURE 1.

Referring now to FIGURE 2, a representative image outphasing circuit 1 producing the required outputs on lines 16 and 17 comprises hybrid coupler 18, balanced mixer circuits 19 and 20, and hybrid coupler 21. Coupler 18 is a 3-db 90° hybrid circuit having one input port connected to line 7, the other input port being terminated in a matched load 24. The output ports of the hybrid coupler are connected by lines 25 and 26, respectively, to the associated mixer circuits 19 and 20. The signals on lines 25 and 26 are equal in amplitude and 90° out-of-phase with each other.

The output of the VCO on line 11 is divided by power splitter 27 and applied on lines 29 and 30 to mixer circuits 19 and 20, respectively. The signals on lines 29 and 30 are equal in amplitude and are either in-phase, as indicated in FIGURE 2 or 180° out-of-phase.

The mixer circuits are responsive to the associated input signals for producing difference frequency signals. The outputs of mixer circuits 19 and 20 on lines 31 and 32, respectively, are applied to the input ports of hybrid coupler 21 which is also a 3-db 90° hybrid coupler circuit. Combining circuit 2 comprises detectors 34 and 34', integrators 35 and 35' and difference amplifier 36. Detector 34 and integrator 35 are connected in series between one output port of hybrid coupler 21 on line 16 and the first input to the difference amplifier on line 37. Similarly, detector 34' and integrator 35' are connected between the other ouput port of hybrid coupler 21 on line 17 and the input to the difference amplifier on line 37'.

For the sake of simplicity of describing and understanding the invention, the operation of the system of FIGURE 2 will first be described in response to a single frequency continuous wave (CW) signal. The operation of the system will then be described in response to pulse signals comprised of many component frequencies (the carrier frequency and harmonics of the pulse repetition frequency). As stated previously, the system operates over the frequency band $f_{LOW}$ to $f_{UP}$ determined by filter 6 (see FIGURE 3). During quiescent conditions when no signal is received by the system, the output frequency of the VCO is $f_0$ which is centered between $f_{LOW}$ and $f_{UP}$. Consider that a sinusoidally varying CW signal having a frequency $f_{S1}$ within the passband of filter 6 and less than the oscillator frequency $f_0$ is received by the system. Hybrid coupler 18 operates on the received signal to produce equal amplitude phase quadrature signals on lines 25 and 26 having the frequencies $f_{S1}-90°$ and $f_{S1}$, respectively. Mixer circuits 19 and 20 combine the associated input signals to produce difference frequency signals on lines 31 and 32 having the frequencies $f_0-f_{S1}+90°$ and $f_0-f_{S1}$, respectively.

Hybrid coupler 21 couples the signal on line 31 to line 17 without a shift in phase but introduces a 90° phase shift in the signal coupled from line 32 to line 17. Thus, signals having the frequencies $$f_0-f_{S1}+90° \quad (1)$$

and $$f_0-f_{S1}-90° \quad (2)$$

are present on line 17. These signals cancel since they are of equal amplitude and 180° out-of-phase. Conversely, hybrid coupler 21 couples the signal on line 32 to line 16 without a phase shift but introduces a 90° phase shift in the signal coupled from line 31 to line 16. Thus, signals having the frequencies $$f_0-f_{S1} \quad (3)$$

and $$f_0-f_{S1}+90°-90° \quad (4)$$

are present on line 16; the signal components with frequency $f_0-f_{S1}$ being present because they are in phase. Thus, it is seen from the above that a signal with a frequency $f_0-f_{S1}$ is present only on line 16 when a CW signal having a frequency $f_{S1}$ less than the oscillator frequency $f_0$ is received by the system. This signal on line 16 is rectified by detector 34 and summed by integrator 35. The sum signal on line 37 biases amplifier 36 to produce a voltage on line 9 which causes the oscillator to shift its frequency to $f_{S1}$.

Consider now the operation of the system when a CW signal having a frequency $f_{S2}$ that is within the passband of filter 6 and is greater than the oscillator frequency $f_0$ is received by the system. Since the signal frequency $f_{S2}$ that is within the passband of filter 6 and is greater than the oscillator frequency $f_0$ is received by the system. Since the signal frequency $f_{S2}$ is greater than the oscillator frequency $f_0$, the difference frequency signals from the mixer circuits on lines 31 and 32 have the frequencies $f_{S2}-f_0-90°$ and $f_{s2}-f_0$, respectively. Hybrid coupler 21 is responsive to the mixer circuit outputs for providing on line 16 signals having the frequencies $$f_{s2}-f_0-90°-90° \quad (5)$$

and $$f_{S2}-f_0 \quad (6)$$

These signals on line 16 cancel since they are of equal magnitude and 180° out-of-phase. Hybrid coupler 21 is also responsive to the mixer circuit outputs for providing signals on line 17 having the frequencies $$f_{s2}-f_0-90° \quad (7)$$

and $$f_{S2}-f_0-90° \quad (8)$$

Since these signals are in phase, a signal having the frequency $f_{S2}-f_0-90°$ is therefore present on line 17. Thus, it is seen that a signal having the frequency $f_{S2}-f_0-90°$ is present only on line 17 when a CW signal having a frequency $f_{S2}$ that is greater than the oscillator frequency $f_0$ is received by the system. The signal on line 17 is rectified by detector 34′ and summed by integrator 35′. The sum signal on line 37′ biases amplifier 36 to again produce a voltage on line 9 that biases the oscillator to change the frequency thereof to be equal to the frequency $f_{S2}$.

The operation of this invention in response to a pulse signal will now be described. The spectrum of a typical pulse signal is represented by the waveform 40 of FIGURE 4 and comprises a sinusoidally varying signal component having a carrier frequency $f_{S1'}$ and a plurality of sinusoidally varying signal components having frequencies that are harmonics of the pulse repetition frequency. The centroid frequency of the pulse is defined as that frequency in the pulse spectrum which equally divides the energy in the frequencies of the spectrum. In short, the centroid frequency is the mid-energy frequency of the pulse spectrum. The centroid frequency of a pulse having a symmetrical spectrum such as that represented by waveform 40 is the carrier frequency $f_{S1'}$. A signal having a spectrum that is not symmetrical about its center frequency, however, has a centroid frequency offset from the midband frequency.

Figure 4:
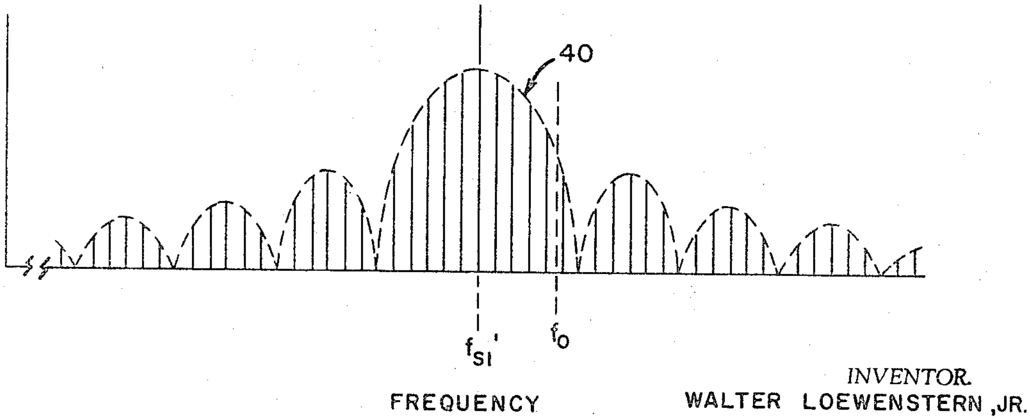
FIGURE 4 is a graphic representation of the spectrum of a pulse signal.

Consider that a pulse having the centroid frequency $f_{S1'}$ which is less than the oscillator frequency $f_0$ is received by the system. Reference to FIGURE 4 reveals that such a pulse signal may contain both sinusoidally varying signal components having frequencies that are less than and greater than the oscillator frequency $f_0$. The separation circuit 1 is responsive to these sinusoidally varying signal components for passing on line 16 all the signal energy having a frequency $f_S$ less than the oscillator frequency $f_0$ and passing on line 17 all the signal energy having a frequency $f_S$ greater than the oscillator frequency $f_0$. The outputs of hybrid coupler 21 are rectified by the associated detectors and summed by the associated integrators to provide signals on lines 37 and 37′ that are representative of the power in the pulse having frequencies less than and greater than the oscillator frequency, respectively. The difference amplifier subtracts the sum signals on lines 37 and 37′ to produce a voltage on line 9 that biases the VCO to change the frequency thereof to be equal to the centroid frequency $f_{S1'}$ of the pulse.

Although this invention is described in relation to specific embodiments thereof, the scope of the invention is defined in the following claims rather than in the above detailed description.

What is claimed is:

1. A system for producing an electromagnetic signal having the same frequency as the centroid frequency of an incident pulse signal comprised of component signals having frequencies greater than and less than the centroid frequency, said system comprising an electronically tuned oscillator, means responsive to the incident pulse signal and the output signal of said oscillator for separating the pulse into a first output signal comprising the pulse energy having frequencies less than the frequency of oscillation of said oscillator and into a second output signal comprising the pulse energy having frequencies greater than the frequency of oscillation of said oscillator, and means combining the first and second output signals of said separating means and producing an output signal proportional to the difference in the power in the incident pulse having frequencies less than and greater than the frequency of oscillation of said oscillator, said oscillator being responsive to the output of said combining means for causing the frequency of oscillation thereof to be equal to the centroid frequency of the incident pulse.

2. The system according to claim 1 wherein said separating means comprises an image outphasing circuit.

3. The system according to claim 1 wherein said combining means comprises first and second detectors, first and second integrators, and a difference amplifier having first and second input terminals and an output terminal, said first detector and integrator being connected in series between the first output of said separating means and the first input of said amplifier, said second detector and integrator being connected in series between the second output of said separating means and the second input of said amplifier, said oscillator being responsive to the output of said amplifier.

No references cited.

JOHN KOMINSKI, *Primary Examiner.*

U.S. Cl. X.R.

331—12, 19